United States Patent
Joseph et al.

(10) Patent No.: US 8,304,482 B2
(45) Date of Patent: Nov. 6, 2012

(54) RUBBER COMPOSITION IN PARTICULAR FOR THE MANUFACTURE OF TIRES

(75) Inventors: Aurélie Joseph, Clermont-Ferrand (FR); Aline Riou, Cebazat (FR)

(73) Assignees: Michelin Recherche et Technique S.A., Granges-Paccot (CH); Compagnie Generale des Establishments Michelin, Clermont-Ferrand (FR)

( * ) Notice: Subject to any disclaimer, the term of this patent is extended or adjusted under 35 U.S.C. 154(b) by 0 days.

(21) Appl. No.: 12/747,166

(22) PCT Filed: Dec. 16, 2008

(86) PCT No.: PCT/EP2008/067665
§ 371 (c)(1),
(2), (4) Date: Sep. 1, 2010

(87) PCT Pub. No.: WO2009/077541
PCT Pub. Date: Jun. 25, 2009

(65) Prior Publication Data
US 2010/0324200 A1    Dec. 23, 2010

(30) Foreign Application Priority Data
Dec. 18, 2007 (FR) .................................. 07 59916

(51) Int. Cl.
*C08K 3/34* (2006.01)
*B60C 1/00* (2006.01)

(52) U.S. Cl. .......................................... 524/492; 524/526
(58) Field of Classification Search ................... 524/492
See application file for complete search history.

(56) References Cited

U.S. PATENT DOCUMENTS

| 5,538,218 A * | 7/1996 | Patitsas et al. ................. 249/65 |
| 6,372,855 B1 | 4/2002 | Chino et al. |
| 7,576,155 B2 * | 8/2009 | Wang et al. .................... 524/445 |
| 2004/0239735 A1 * | 12/2004 | Mashita et al. ................ 347/86 |

FOREIGN PATENT DOCUMENTS

| EP | 0 711 642 | 5/1996 |
| JP | 2004143366 A * | 5/2004 |

OTHER PUBLICATIONS

Translation of JP 2004-143366, May 2004.*

* cited by examiner

*Primary Examiner* — Hui Chin
(74) *Attorney, Agent, or Firm* — Cozen O'Connor

(57) ABSTRACT

A rubber composition, in particular intended for the manufacture of tires, based on at least a predominant elastomer, chosen from the group consisting of butyl rubbers, essentially unsaturated diene elastomers, essentially saturated diene elastomers and the mixtures of these elastomers, and a reinforcing filler, characterized in that the composition also comprises graphite and a functionalized or nonfunctionalized polyisobutylene oil, having a molecular weight of between 200 g/mol and 40 000 g/mol, present in a proportion of between 2 and 50 phe.

34 Claims, No Drawings

RUBBER COMPOSITION IN PARTICULAR FOR THE MANUFACTURE OF TIRES

RELATED APPLICATIONS

This is a U.S. national stage under 35 USC §371 of application No. PCT/EP2008/067,665, filed on Dec. 16, 2008.

This application claims the priority of French application No. 07/59,916 filed Dec. 18, 2007, the entire content of which is hereby incorporated by reference.

FIELD OF THE INVENTION

The present invention relates to a rubber composition for the manufacture of tires and in particular for the manufacture of an air-impermeable internal layer, commonly known as "inner liner", of tires.

BACKGROUND OF THE INVENTION

Tires exhibit an internal surface of low permeability to air in order to prevent deflation of the tire and to protect sensitive internal regions of the latter from admissions of oxygen and water, such as plies comprising oxidation-sensitive metal cables, this protection making it possible to improve the endurance of the tire. Today, such protection of the internal surface of the tires is provided by inner liners composed of elastomeric compositions based on butyl rubber.

However, since savings in fuel and the need to protect the environment have become a priority, it is desirable to produce inner liners which are impermeable to air and which exhibit a weight and a hysteresis which are as low as possible, in order to obtain an improved rolling resistance of the tire. In point of fact, the performance in terms of impermeability to air of butyl rubbers is related to a not insignificant minimum thickness (of the order of a millimeter) and thus to a certain weight, which does not make it possible to efficiently respond to these new requirements.

Thus, it is necessary to add reinforcing fillers, such as carbon black, to the inner liner elastomeric composition in order to improve its impermeability. However, in a large amount, these reinforcing fillers have a detrimental effect on some properties of the composition, both in the raw state: difficulty in working the raw composition, commonly known as "processability", and in the cured state: deterioration in mechanical properties, in particular reduction in the flexural strength. The introduction of plasticizer of oil type makes it possible to overcome these aspects of working and of mechanical properties but is very highly disadvantageous to the impermeability.

Various solutions have been envisaged in order to overcome these disadvantages, in particular by resorting to other types of fillers which are additional to the reinforcing fillers, often known under the name of smectites and in particular of organophilic smectites. These organophilic smectites improve the impermeability properties of the materials if they are well dispersed in the material, that is to say both a homogeneous distribution of these fillers in the material and good compatibility with the latter. This dispersion is often difficult to obtain due to the low thermodynamic compatibility existing between the elastomers and such fillers.

The publication JP 2004143366A describes a tire inner liner composition based on butyl rubber which comprises carbon black and which also comprises graphite dispersed in the elastomeric matrix, the addition of this graphite making it possible to improve the impermeability to gases. However, the fact of adding an additional filler is harmful to the processibility of the mixture.

Commonly assigned French patent application number 07/03751, filed 25 May 2007, not yet published to date, discloses adding graphite and a resin having a glass transition temperature of greater than 30° C. which makes it possible both to improve the processibility of the mixture (with regard to a mixture not comprising graphite or comprising graphite alone) and to improve the impermeability of the composition (with regard to a mixture not comprising graphite and with regard to a mixture comprising graphite alone).

The assignee has continued these research studies and has discovered, surprisingly, that the combination, in a rubber composition for a tire inner liner, of a polyisobutylene oil of low molecular weight with graphite, in the presence of the elastomer conventionally used, such as butyl rubber, and of a reinforcing filler, makes it possible not only to obtain properties of processibility and of flexural strength which are as good as those of the compositions of the prior art but also to obtain improved properties of impermeability to gases and to significantly improve the properties of rolling resistance and of endurance without, of course, this being at the expense of other properties.

As was mentioned above, oils are known for their property of improving the processibility but it is also known that they can be harmful to the leaktightness. It has been found here, surprisingly, on the one hand, that the graphite and low weight polyisobutylene oil combination makes it possible to improve the leaktightness, including with respect to a composition including only graphite, and, on the other hand, that this composition also makes it possible, at the same leaktightness with respect to the graphite/resin solution (abovementioned commonly assigned French application), to lower the hysteresis of the mixture and thus to lower the rolling resistance of a tire having an inner liner made from this composition.

SUMMARY OF THE INVENTION

One object of the invention is to provide a novel composition, in particular for a tire inner liner, exhibiting properties of impermeability which are further improved with respect to the abovementioned solutions and an improved rolling resistance, without a deterioration in the mechanical properties of processibility and of flexural strength.

One aspect of the invention relates to a rubber composition based on at least a predominant elastomer, chosen from the group consisting of butyl rubbers, essentially unsaturated diene elastomers, essentially saturated diene elastomers and the mixtures of these elastomers, and a reinforcing filler, characterized in that the composition also comprises graphite and a functionalized or nonfunctionalized polyisobutylene oil, having a molecular weight of between 200 g/mol and 40 000 g/mol, preferably between 500 g/mol and 35,000 g/mol and more preferably still between 1000 g/mol and 30 000 g/mol, present in a proportion of between 2 and 50 phe.

According to an alternative embodiment of the invention, the predominant elastomer is composed of a butyl rubber and more particularly of a copolymer of isobutene and of isoprene or a brominated or chlorinated polyisobutylene.

According to another alternative embodiment of the invention, the predominant elastomer is a diene elastomer and advantageously an essentially unsaturated or essentially saturated diene elastomer.

According to one embodiment of the invention, the predominant elastomer represents 100% of the elastomers of the composition.

According to another embodiment of the invention, the composition comprises one or more other elastomers chosen from the group consisting of butyl rubbers, essentially unsaturated diene elastomers, essentially saturated diene elastomers and the mixtures of these elastomers.

Advantageously, the graphite is provided in a lamellar form.

The graphite can be a natural, expandable, expanded or synthetic graphite; it can also be a mixture of natural graphite and/or of expandable natural graphite and/or of expanded graphite and/or of synthetic graphite.

Another aspect of the invention relates to a tire article having a rubber composition based on at least a predominant elastomer, chosen from the group consisting of butyl rubbers, essentially unsaturated diene elastomers, essentially saturated diene elastomers and the mixtures of these elastomers, and a reinforcing filler, characterized in that the composition also comprises graphite and a functionalized or nonfunctionalized polyisobutylene oil, having a molecular weight of between 200 g/mol and 40 000 g/mol, preferably between 500 g/mol and 35 000 g/mol and more preferably still between 1000 g/mol and 30 000 g/mol, present in a proportion of between 2 and 50 phe, and also relates to a tire comprising such a rubber composition.

Another aspect of the invention relates to a process for preparing a composition based on at least a predominant elastomer, chosen from the group consisting of butyl rubbers, essentially unsaturated diene elastomers, essentially saturated diene elastomers and the mixtures of these elastomers, and a reinforcing filler, characterized in that the composition also comprises graphite and a functionalized or nonfunctionalized polyisobutylene oil, the said process comprising the following stages:

incorporating in a diene elastomer, in a mixer:
    a reinforcing filler,
    graphite,
    a polyisobutylene oil,
    everything being kneaded thermomechanically, in one or more goes, until a maximum temperature of between 110° C. and 190° C. is reached;
  subsequently incorporating:
    a crosslinking system;
    kneading everything up to a maximum temperature of less than 110° C.

I. Measurements and Tests

The rubber compositions are characterized, before and after curing, as indicated below.

I-1. Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 newton.meter).

I-2. Tensile Tests

These tests make it possible to determine the elasticity stresses and the properties at break. Unless otherwise indicated, they are carried out in accordance with French Standard NF T 46-002 of September 1988. The "nominal" secant moduli (or apparent stresses, in MPa) are measured in second elongation (i.e., after a cycle of accommodation) at 10% elongation (denoted "EM10") and 100% elongation ("EM100"). All these tensile measurements are carried out under the standard conditions of temperature (23±2° C.) and hygrometry (50±5% relative humidity) according to French Standard NF T 40-101 (December 1979). The breaking stresses (in MPa) and the elongations at break (in %) are also measured, at a temperature of 23° C.

I-3. Dynamic Properties

The dynamic properties $\Delta G^*$ and $\tan(\delta)$max are measured on a viscosity analyser (Metravib V A4000), according to Standard ASTM D 5992-96. The response of a sample of vulcanized composition (cylindrical test specimen with a thickness of 2 mm and with a cross section of 78.5 mm$^2$), subjected to a simple alternating sinusoidal shear stress, at a frequency of 10 Hz, under the standard temperature conditions according to Standard ASTM D 1349-99, is recorded. A crest-to-crest strain amplitude sweep is carried out from 0.1% to 50% (outward cycle) and then from 50% to 0.1% (return cycle). The results made use of are the complex dynamic shear modulus ($G^*$) and the loss factor, $\tan(\delta)$. The maximum value of $\tan(\delta)$ observed ($\tan(\delta)$max) and the difference in complex modulus ($\Delta G^*$) between the values at 0.15% and 50% strain (Payne effect) are shown for the return cycle.

I-4. Permeability

The permeability values are measured using a Mocon Oxtran 2/60 permeability "tester" at 40° C. Cured samples in the form of discs with a predetermined thickness (approximately 0.8 to 1 mm) are fitted to the device and rendered leaktight with vacuum grease. One of the faces of the disc is kept under 10 psi of nitrogen while the other face is kept under 10 psi of oxygen. The increase in the concentration of oxygen is monitored using a "Coulox" oxygen detector on the face kept under nitrogen. The concentration of oxygen on the face kept under nitrogen which makes it possible to achieve a constant value, used to determine the permeability to oxygen, is recorded.

An arbitrary value of 100 is given for the permeability to oxygen of the control, a result of less than 100 indicating a reduction in the permeability to oxygen and thus a better impermeability.

II. DETAILED DESCRIPTION OF EMBODIMENTS OF THE INVENTION

The rubber composition according to an embodiment of the invention, based on at least a predominant elastomer (that is to say, for more than 50 phe), chosen from the group consisting of butyl rubbers, essentially unsaturated diene elastomers, essentially saturated diene elastomers and the mixtures of these elastomers, and a reinforcing filler, is characterized in that it also comprises graphite and a functionalized or nonfunctionalized polyisobutylene oil, having a molecular weight of between 200 g/mol and 40 000 g/mol, present in a proportion of between 2 and 50 phe.

For the use thereof as inner liner of a tire, the composition comprises, as predominant elastomer, an elastomer chosen from the group consisting of butyl rubbers. However, the improved properties of leaktightness and of hysteresis of the compositions in accordance with the invention make it possible to also recommend their use at other points in the tire (tread, sidewall, and the like) which predominantly use essentially unsaturated or saturated diene elastomers and/or mixtures of the latter.

Unless expressly indicated otherwise, the percentages shown in the present patent application are % by weight.

II-1. Elastomer or "Rubber"

Normally, the terms "elastomer" and "rubber", which are interchangeable, are used without distinction in the text.

The composition in accordance with the invention intended for a leaktight inner liner of a tubeless tire comprises at least one butyl rubber, used alone or as a mixture with one or more other butyl rubbers or diene elastomers.

The term "butyl rubber" is understood to mean a homopolymer of poly(isobutylene) or a copolymer of poly (isobutylene) with isoprene (in this case, this butyl rubber is included among the diene elastomers) and the halogenated derivatives, in particular generally the brominated or chlorinated derivatives, of these homopolymers of poly(isobutylene) and copolymers of poly(isobutylene) and of isoprene.

Mention will be made, as examples of butyl rubber particularly suitable for the implementation of the invention, of copolymers of isobutylene and of isoprene (IIR), bromobutyl rubbers, such as the bromoisobutylene/isoprene copolymer (BIIR), chlorobutyl rubbers, such as the chloroisobutylene/isoprene copolymer (CIIR), and isobutylene rubbers.

By extension of the preceding definition, the name "butyl rubber" will also include copolymers of isobutylene and of styrene derivatives, such as copolymers of isobutylene and of brominated methylstyrene (BIMS), among which is included in particular the elastomer called Exxpro sold by Exxon.

The term "diene" elastomer or rubber should be understood as meaning, in a known way, an (one or more are understood) elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated".

The term "essentially unsaturated" is understood to mean generally a diene elastomer resulting at least in part from conjugated diene monomers having a level of units of diene origin (conjugated dienes) which is greater than 15% (mol %). In the category of "essentially unsaturated" diene elastomers, the term "highly unsaturated" diene elastomer is understood to mean in particular a diene elastomer having a level of units of diene origin (conjugated dienes) which is greater than 50%.

Thus it is that diene elastomers, such as some butyl rubbers or copolymers of dienes and of α-olefins of EPDM type, can be described as "essentially saturated" diene elastomers (low or very low level of units of diene origin, always less than 15%).

Given these definitions, the term diene elastomer, whatever the above category, capable of being used in the compositions in accordance with the invention is understood more particularly to mean:

(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;
(d) a copolymer of isobutene and of isoprene (diene butyl rubber) and also the halogenated versions, in particular chlorinated or brominated versions, of this type of copolymer.

Although it applies to any type of diene elastomer, a person skilled in the art of tires will understand that, for use as tire inner liner, the present invention is preferably employed with essentially saturated elastomers, in particular of the type (d) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1, 3-butadiene, 2,3-diethyl-1,3-butadiene, 2-methyl-3-ethyl-1, 3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. Mention may be made, for coupling to carbon black, for example, of functional groups comprising a C—Sn bond or aminated functional groups, such as benzophenone, for example; mention may be made, for coupling to a reinforcing inorganic filler, such as silica, of, for example, silanol or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or polyether groups (such as described, for example, in EP 1 127 909 or U.S. Pat. No. 6,503,973). Mention may also be made, as other examples of functionalized elastomers, of elastomers (such as SBR, BR, NR or IR) of the epoxidized type.

The following are suitable: polybutadienes, in particular those having a content (molar %) of 1,2-units of between 4% and 80% or those having a content (molar %) of cis-1,4-units of greater than 80%, polyisoprenes, butadiene/styrene copolymers and in particular those having a glass transition temperature Tg (measured according to ASTM D3418) of between 0° C. and −70° C. and more particularly between −10° C. and −60° C., a styrene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/styrene/isoprene copolymer having a Tg of between −20° C. and −70° C., are suitable in particular.

Finally, the term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (IIR), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of polyisoprenes having a level (molar %) of cis-1,4-bonds of greater than 90%, more preferably still of greater than 98%.

To Sum Up:

According to one embodiment of the invention: the predominant elastomer of the composition in accordance with the invention is a butyl rubber (in particular for applications as tire inner liners); the latter is preferably chosen from the group of the essentially saturated diene elastomers consisting of copolymers of isobutene and of isoprene and their halogenated derivatives, it being possible for this essentially saturated elastomer to be used as a mixture with an elastomer chosen from the group of the highly unsaturated diene elastomers consisting of polybutadienes (abbreviated to "BR"), synthetic polyisoprenes (IR), natural rubber (NR), butadiene copolymers, isoprene copolymers, butadiene/styrene copolymers (SBR), isoprene/butadiene copolymers (BIR), isoprene/styrene copolymers (SIR) and isoprene/butadiene/styrene copolymers (SBIR) and the mixtures of these elastomers.

According to another embodiment of the invention, the predominant elastomer is an essentially unsaturated diene elastomer of the composition in accordance with the invention; the latter is preferably chosen from the group of the highly unsaturated diene elastomers consisting of polybutadienes (abbreviated to "BR"), synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

In this embodiment, the diene elastomer is predominantly (i.e., for more than 50 phe) an isoprene elastomer or an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) mixture (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

This embodiment corresponds in particular to compositions of the invention intended to constitute, in the tires, rubber matrices of certain treads (for example for industrial vehicles), of crown reinforcing plies (for example of working plies, protection plies or hooping plies), of carcass reinforcing plies, of side walls, of beads, of protectors, of underlayers, of rubber blocks and other inner liners providing the interface between the abovementioned regions of the tires.

II-2. Reinforcing Filler

Use may be made of any type of reinforcing filler known for its capabilities of reinforcing a rubber composition which can be used for the manufacture of tires, for example an organic filler, such as carbon black, a reinforcing inorganic filler, such as silica, or a mixture of these two types of filler, in particular a mixture of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772), indeed even N990.

In the case of use of carbon blacks with an isoprene elastomer, the carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of the functionalized polyvinylaromatic organic fillers as described in Applications WO-A-2006/069792 and WO-A-2006/069793.

The term "reinforcing inorganic filler" should be understood, in the present patent application, by definition, as meaning any inorganic or mineral filler, whatever its colour and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible ("HD") precipitated silicas, for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface as described in Application WO 03/16837.

When the compositions of the invention are intended for tire treads having a low rolling resistance, the reinforcing inorganic filler used, in particular if it is silica, preferably has a BET surface of between 45 and 400 m²/g, more preferably of between 60 and 300 m²/g.

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, as described, for example, in Applications WO 03/002648 (or US 2005/016651) and WO 03/002649 (or US 2005/016650).

"Symmetrical" silane polysulphides corresponding to the following general formula (III):

$$Z\text{-}A\text{-}S_x\text{-}A\text{-}Z, \text{ in which:} \quad (III)$$

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

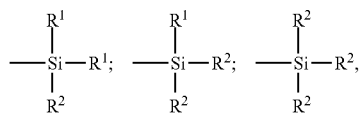

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl), are suitable in particular, without the above definition being limiting.

In the case of a mixture of alkoxysilane polysulphides corresponding to the above formula (III), in particular the usual mixtures available commercially, the mean value of the "x" index is a fractional number preferably of between 2 and 5, more preferably in the vicinity of 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl ($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula $[(C_2H_5O)_3Si(CH_2)_3S_2]_2$, or bis (triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulphides (in particular disulphides, trisulphides or tetrasulphides), more particularly bis(monoethoxydimethylsilylpropyl) tetrasulphide, as described in patent application WO 02/083,782 (or US 2004/132880).

Mention will in particular be made, as coupling agent other than alkoxysilane polysulphide, of bifunctional POSs (polyorganosiloxanes) or of hydroxysilane polysulphides ($R^2$=OH in the above formula III), such as described in patent applications WO 02/30,939 (or U.S. Pat. No. 6,774,255) and WO 02/31041 (or US 2004/051210), or of silanes or POSs carrying azodicarbonyl functional groups, such as described, for example, in Patent Applications WO 2006/125532, WO 2006/125533 and WO 2006/125534.

Finally, a person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

Preferably, the level of total reinforcing filler (carbon black and/or reinforcing inorganic filler, such as silica) is between 20 and 200 phe, more preferably between 30 and 150 phe, the optimum being in a known way different depending on the specific applications targeted: the level of reinforcement expected with regard to a bicycle tire, for example, is, of course, less than that required with regard to a tire capable of running at high speed in a sustained manner, for example a motor cycle tire, a tire for a passenger vehicle or a tire for a utility vehicle, such as a heavy duty vehicle.

For use of the composition as tire inner liner, use is preferably made, as reinforcing filler, of carbon black in a proportion of greater than 30 phe. Preferably, the level of carbon black is between 30 and 120 phe; this is because, beyond this level, the disadvantages in terms of stiffness of the composition are too great for application as tire inner liner. It is clear that carbon blacks of very high ASTM grade, such as carbon black N990, are less reinforcing than carbon blacks of grade 700 and a fortiori 600, and that it is necessary, for identical reinforcement, to use higher levels of carbon black if carbon blacks of grade 900 are concerned than if blacks of grade 600 or 700 are concerned.

More preferably, the proportion of carbon black is between 30 and 70 phe; this is in particular the case when carbon blacks of ASTM grade 600 or 700 are used and this proportion is more preferably still between 35 and 60 phe.

The carbon black can advantageously constitute the sole reinforcing filler or the predominant reinforcing filler. Of course, use may be made of just one carbon black or of a mixture of several carbon blacks of different ASTM grades.

The carbon black can also be used as a mixture with other reinforcing fillers and in particular reinforcing inorganic fillers as described above, in particular silica.

II-3. Filler of Graphite Type

The term graphite is understood to mean, generally, an assembly of non-compact hexagonal sheets of carbon atoms: graphenes. Graphite, a hexagonal crystalline system, exhibits a stack of ABAB type, where the B plane is translated relative to the A plane.

Graphite cannot be regarded as a reinforcing filler within the meaning of the definition specified in section II-2; however, it can be regarded as a semireinforcing filler in so far as it makes possible an increase in the tensile modulus of a rubber composition in which it is incorporated.

These definitions being given, graphite capable of being used in the compositions in accordance with the invention is understood more particularly to mean:

(a) any natural graphite, associated with rocks affected by metamorphism, after separation of the impurities accompanying the graphite veins and after milling;

(b) any thermally expandable natural graphite, i.e. in which one or more chemical compounds in the liquid state, for example an acid, is intercalated between its graphene planes;

(c) any expanded natural graphite, the latter being produced in two steps: intercalation of one or more chemical compounds in the liquid state, for example an acid, between the graphene planes of a natural graphite by chemical treatment and high-temperature expansion;

(d) any synthetic graphite obtained by graphitization of petroleum coke.

The compositions of the invention can comprise just one graphite or a mixture of several graphites; thus, it is possible to have a blend of natural graphite and/or of expanded graphite and/or of synthetic graphite.

The graphite as defined above can be provided morphologically in a lamellar or nonlamellar form.

It has been found, surprisingly, that graphites with either of these two types of morphology are suitable in the compositions in accordance with the invention; however, graphites exhibiting a lamellar form are preferentially suitable, all the more so when they are oriented so as to present their largest face perpendicular to the gas permeation stream.

The graphite is present in the composition in accordance with the invention at levels ranging from 3 phe to 50 phe and preferably between 5 and 30 phe.

Inert (nonreinforcing) fillers, such as silicon-based lamellar fillers and in particular phyllosilicates, such as smectites, kaolin, talc, mica, vermiculite, and the like, can be used as a mixture with the graphite.

II-4. Polyisobutylene Oil

The rubber compositions of the invention use an extending oil (or plasticizing oil), the usual role of which is to facilitate the processing, by a lowering of the Mooney plasticity, and to improve the endurance, by a reduction in the elongation moduli in the cured state.

At ambient temperature (23° C.), these oils, which are more or less viscous, are liquids (that is to say, to recapitulate, substances having the ability in the long run to adopt the shape of their container), in contrast in particular to resins or rubbers, which are by nature solids.

Use is made, in accordance with the invention, of polyisobutylene oils with a number-average molecular weight (Mn) of between 200 g/mol and 40 000 g/mol. For excessively low Mn weights, there exists a risk of migration of the oil outside the composition, whereas excessively high weights can result in excessive stiffening of this composition. The abovementioned polyisobutylene oils of low molecular weight have demonstrated a much better compromise in properties in comparison with the other oils tested, in particular with conventional oils of the paraffinic type.

Preferably, for the compositions in accordance with the invention, the polyisobutylene oils have a molecular weight of between 500 g/mol and 35 000 g/mol and more preferably still of between 1000 g/mol and 30 000 g/mol.

By way of examples, polyisobutylene oils are sold in particular by Univar under the "Dynapak Poly" name (e.g., "Dynapak Poly 190"), by BASF under the "Glissopal" (e.g., "Glissopal 1000") or "Oppanol" (e.g., "Oppanol 812") names, by Texas Petro Chemical under the "TPC" name ("TPC 1350") or by Innovene under the "Indopol" name.

The number-average molecular weight (Mn) of the polyisobutylene oil is determined by SEC, the sample being dissolved beforehand in tetrahydrofuran at a concentration of approximately 1 g/l; the solution is then filtered through a filter with a porosity of 0.45 µm before injection. The device is the "Waters Alliance" chromatographic line. The elution solvent is tetrahydrofuran, the flow rate is 1 ml/min, the temperature of the system is 35° C. and the analysis time is 30 min. Use is made of a set of two "Waters" columns having the name "Styragel HT6E". The volume of the solution of the polymer sample injected is 100 µl. The detector is a "Waters 2410" differential refractometer and its associated software for making use of the chromatographic data is the "Waters Millenium" system. The average molar masses calculated are relative to a calibration curve produced with polystyrene standards.

The polyisobutylene oils with a low molecular weight suitable for the invention may or may not be functionalized. Thus, mention may be made, as nonlimiting example, of some functionalizations of polyisobutylene oils, such as polyisobutylene succinic anhydride oils, PIBSA, or polyisobutylene succinimide oils, PIBSI.

The level of polyisobutylene oil is preferably between 2 and 50 phe. Below the minimum indicated, there is a risk of the elastomer layer or composition exhibiting a stiffness which is too high for some applications, while, above the maximum recommended, a risk exists of insufficient cohesion of the composition and of loss of leaktightness, which may be harmful depending on the application under consideration.

The level of polyisobutylene oil is more preferably still between 5 and 30 phe.

II-5. Various Additives

The rubber compositions in accordance with the invention can also comprise all or a portion of the usual additives generally used in elastomer compositions intended for the manufacture of tires or semi-finished products for tires, such as, for example, other plasticizing agents (other than the plasticizing system of the invention), preferably non-aromatic or very slightly aromatic plasticizing agents, for example naphthenic or paraffinic oils, MES or TDAE oils, glycerol esters (in particular trioleates), especially natural esters, such as rapeseed or sunflower vegetable oils, pigments, protection agents, such as antiozonants, antioxidants or antifatigue agents, a crosslinking system based either on sulphur or on sulphur donors and/or on peroxide and/or on bismaleimides, vulcanization accelerators, vulcanization activators or antireversion agents.

These compositions can also comprise, in addition to coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their ability to be processed in the raw state, these agents being, for example, hydrolysable silanes, such as alkylalkoxysilanes, polyols, polyethers, primary, secondary or tertiary amines or hydroxylated or hydrolysable polyorganosiloxanes.

II-6. Manufacture of the Rubber Compositions

The compositions are manufactured in appropriate mixers using two successive preparation phases well known to a person skilled in the art: a first phase of thermomechanical working or kneading at high temperature, up to a maximum temperature of between 110° C. and 190° C., preferably between 130° C. and 180° C., followed by a second phase of mechanical working up to a lower temperature, typically of less than 110° C., for example between 40° C. and 100° C., finishing phase during which the crosslinking system is incorporated.

The process in accordance with an aspect the invention for preparing a rubber composition for a tire inner liner comprises the following stages:

incorporating in an elastomer, during a first stage, at least a reinforcing filler, graphite and a polyisobutylene oil, everything being kneaded thermomechanically, in one or more goes, until a maximum temperature of between 110° C. and 190° C. is reached;

subsequently incorporating, during a second stage, a crosslinking system;

kneading everything up to a maximum temperature of less than 110° C.

These two stages can be carried out consecutively on the same mixer or can be separated by a stage of cooling to a temperature of less than 100° C., the last stage then being carried out on a second mixer.

By way of example, the first phase is carried out in a single thermomechanical stage during which, in a first step, all the necessary base constituents (elastomer, reinforcing filler and coupling agent, if necessary, graphite and polyisobutylene oil) are introduced into an appropriate mixer, such as a normal internal mixer, followed, in a second step, for example after kneading for one to two minutes, by the other additives, optional additional covering agents or processing aids, with the exception of the crosslinking system. After cooling the mixture thus obtained, the crosslinking system is then incorporated in an external mixer, such as an open mill, maintained at a low temperature (for example, between 40° C. and 100° C.). The combined mixture is then mixed for a few minutes, for example between 2 and 15 min.

It should be noted that in particular when the predominant elastomer is chosen from butyl rubbers, the incorporation of the vulcanization system takes place on the same mixer as in the first phase of thermomechanical working.

The crosslinking system is preferably a vulcanization system based on sulphur and on an accelerator. Use may be made of any compound capable of acting as accelerator of the vulcanization of elastomers in the presence of sulphur, in particular those chosen from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-tert-butyl-2-benzothiazole-sulphenamide (abbreviated to "TBBS"), N-tert-butyl-2-benzothiazolesulphenimide (abbreviated to "TBSI") and the mixtures of these compounds. Preferably, a primary accelerator of the sulphenamide type is used.

Additional to this vulcanization system are various known secondary accelerators or vulcanization activators, such as zinc oxide, stearic acid, guanidine derivatives (in particular diphenylguanidine), and the like, incorporated during the first phase and/or during the second phase.

The final composition thus obtained is subsequently calendered, for example in the form of a sheet or of a plaque, in particular for laboratory characterization, or else is extruded in the form of a rubber profiled element which can be used as tire inner liner.

The vulcanization (or curing) is carried out in a known way at a temperature generally of between 130° C. and 200° C. for a sufficient time which can vary, for example, between 5 and 90 min depending in particular on the curing temperature, the vulcanization system adopted and the vulcanization kinetics of the composition under consideration.

An aspect of the invention relates to the rubber compositions described above both in the "raw" state (i.e., before curing) and in the "cured" or vulcanized state (i.e., after vulcanization).

III. EXAMPLES OF THE IMPLEMENTATION OF THE INVENTION

The examples which follow make it possible to illustrate the invention; however, the latter should not be limited to these examples alone.

Preparation of the Rubber Compositions

The tests are carried out in the following way: the reinforcing filler, the graphite, the polyisobutylene oil, the butyl rubber and various other optional ingredients, with the exception of the vulcanization system, are successively introduced into an internal mixer, 75% filled and having an initial vessel temperature of approximately 60° C. Thermomechanical working is then carried out in one stage, which lasts in total approximately from 3 to 4 minutes, until a maximum "dropping" temperature of 140° C. is reached.

The mixture thus obtained is recovered and cooled and then sulphur and an accelerator of sulphenamide type are incorporated on an external mixer (homofinisher) at 30° C., everything being mixed for an appropriate time (for example between 5 and 12 min).

The compositions thus obtained are subsequently extruded, either in the form of plaques (thickness of 2 to 3 mm) or of fine sheets of rubber, for the measurement of their physical or mechanical properties, or extruded in the form of tire inner liners.

Example 1

The object of this test is to show the improvement in performance of a composition according to the invention in terms of rubber properties, in comparison with two control compositions of the prior art.

The three compositions A1, B1 and C1 were prepared in accordance with the process described in detail in the preceding section and have the same following base formulation 1, where the amounts are expressed in phe, parts by weight per hundred parts of elastomer:

| | |
|---|---|
| Butyl elastomer (1) | 100 |
| Carbon black (N772) | 50 |
| Zinc oxide | 1.5 |
| Stearic acid | 1.5 |
| Accelerator (2) | 1.2 |
| Sulphur | 1.5 |

(1): Brominated polyisobutylene "Bromobutyl 3220", sold by Exxon Chemical Co.
(2): 2-Mercaptobenzothiazyl disulphide, MBTS.

The compositions A1, B1 and C1 are defined as follows:
the control composition A1 is a "conventional" tire inner liner composition not including graphite,
the control composition B1 corresponds to a tire inner liner composition comprising graphite like some documents of the prior art,
the composition C1 in accordance with the present invention comprises graphite and a polyisobutylene oil of low molecular weight at levels in accordance with the invention.

The formulation differences are presented in the following Table 1:

TABLE 1

| | Composition N° | | |
|---|---|---|---|
| | A1 | B1 | C1 |
| Graphite (3) | — | 10 | 10 |
| Polyisobutylene oil (4) | — | — | 10 |

(3): Natural graphite "Timrex 80*150" sold by Timcal
(4): Polyisobutylene oil "Oppanol B12 SFN", sold by BASF (molecular weight Mn = 25 000 g/mol)

The rubber properties of these three compositions are measured before curing and after curing at 150° C. for 60 minutes. The results obtained are given in Table 2.

TABLE 2

| | Composition N° | | |
|---|---|---|---|
| | A1 | B1 | C1 |
| Properties before curing | | | |
| Mooney | 74 | 73 | 64 |
| Properties after curing | | | |
| EM10 (MPa) | 2.57 | 3.46 | 2.76 |
| EM100 (MPa) | 0.90 | 1.14 | 0.92 |
| Breaking stress (MPa) | 11.4 | 9.1 | 9.5 |
| Elongation at break (%) | 756 | 652 | 766 |
| Permeability to oxygen | 100 | 64 | 65 |
| Tan(δ)max - return cycle (60° C.-10 Hz) | 0.46 | 0.46 | 0.46 |

It is found that the composition C1 in accordance with the invention, comprising graphite and a polyisobutylene oil of low molecular weight, exhibits, in the raw state, a much better processability (lower Mooney) than the control compositions A1 and B1.

After curing, it is found that the composition C1 in accordance with the invention exhibits a permeability which is markedly lower than that of the control composition A1 and of the same level as that of the composition B1.

Furthermore, the moduli obtained for the composition C1 in accordance with the invention are equivalent overall to those of the conventional control composition A1 and the properties of elongation at break and of breaking stress are close to those of the control composition A1, whereas the composition B1 exhibits moduli and properties of elongation at break and of breaking stress which have deteriorated in comparison with the control composition A1 (and thus a fortiori in comparison with the composition C1).

This improvement in the moduli of the composition C1 in accordance with the invention in comparison with the composition B1 reflects an improvement in the performance in terms of endurance of the tire having an inner liner having a composition C1 in accordance with the invention.

It should also be noted that the three compositions A1, B1 and C1 exhibit a similar tan(δ)max value, which means in particular that there is no deterioration in the hysteresis for the compositions in accordance with the invention.

Thus, the composition C1 in accordance with the invention, including graphite and a polyisobutylene oil of low molecular weight, makes possible a strong improvement in the leaktightness properties in comparison with a conventional control composition A1 and of the same level as a control composition B1 possessing graphite. Furthermore, the composition C1 in accordance with the invention makes it possible, simultaneously with regard to the control compositions A1 and B1, to improve the stiffness properties, which has consequences for the processability, and to improve the endurance, the energy at break (the energy at break being proportional to the product of the elongation at break and the breaking stress), in comparison with the composition B1.

These properties of the composition C1 in accordance with the invention are obtained without a deterioration in the hysteresis and thus in the rolling resistance for the tire, either in comparison with the composition A1 or with the composition B1.

It should in particular be noted that the optimization for the composition B1 with the aim of improving the leaktightness by the introduction of graphite into the composition is achieved at the expense of other rubber properties.

Example 2

The object of this test is to show the improvement, for a composition in accordance with the invention, in the properties of impermeability to gases, in rolling resistance and in endurance in comparison with a composition of the prior art (that of the French application of the Applicant Company No. 07/03751) already optimized for all the rubber properties in comparison with "conventional" tire inner liner compositions.

A conventional control (within the meaning specified in Example 1) is also present in this test in order to further clarify the comparisons.

The three compositions A2, C2 and D2 were thus prepared in accordance with the process described above and have a base formulation corresponding to that described in detail in Example 1. However, they were produced during a second test, which explains why the results obtained for the combined properties measured are not exactly identical to those in Table 2, even for a conventional control composition A2 and a composition in accordance with the invention C2.

The compositions A, C and D differ from one another as follows:

the control composition A2 is a "conventional" tire inner liner composition not including graphite, the composition C2 in accordance with the invention comprises graphite and a polyisobutylene oil of low molecular weight at levels in accordance with the invention, the control composition D2 comprises graphite in the same proportion as the composition C2 and also a plasticizing resin.

The formulation differences of these three compositions are presented in the following Table 3:

TABLE 3

| | Composition N° | | |
|---|---|---|---|
| | A2 | D2 | C2 |
| Graphite (3) | — | 10 | 10 |
| Polyisobutylene oil (4) | — | — | 10 |
| Plasticizing resin (5) | — | 10 | — |

(5) Aliphatic resin (pure C5) "Hikorez A-1100" (Tg = 50° C., softening point 99° C.), sold by Kolon.

The rubber properties of these three compositions are measured before curing and after curing at 150° C. for 60 minutes. The results are given in Table 4.

TABLE 4

| | Composition N° | | |
|---|---|---|---|
| | A2 | D2 | C2 |
| Properties before curing | | | |
| Mooney | 68 | 54 | 55 |
| Properties after curing | | | |
| EM10 (MPa) | 2.21 | 2.92 | 3.05 |
| EM100 (MPa) | 0.67 | 0.85 | 0.89 |
| Breaking stress (MPa) | 9.9 | 9.8 | 9.3 |
| Elongation at break (%) | 861 | 785 | 706 |
| Permeability to oxygen | 100 | 69 | 65 |
| Tan(δ)max - return cycle (60° C.-10 Hz) | 0.44 | 0.62 | 0.46 |

TABLE 5

| | Composition N° | | | |
|---|---|---|---|---|
| | A1 | C1 | F1 | G1 |
| Properties before curing | | | | |
| Mooney | 74 | 64 | 60 | 61 |
| Properties after curing | | | | |
| EM10 (MPa) | 2.57 | 2.76 | 2.85 | 2.88 |
| EM100 (MPa) | 0.90 | 0.92 | 0.99 | 1.01 |
| Breaking stress (MPa) | 11.4 | 9.5 | 9.1 | 8.9 |
| Elongation at break (%) | 756 | 766 | 696 | 692 |
| Permeability to oxygen | 100 | 65 | 74 | 72 |
| Tan(δ)max - return cycle (60° C.-10 Hz) | 0.46 | 0.46 | 0.46 | 0.46 |

It is found that the composition D2 of the prior art of the Applicant Company, comprising graphite in combination with a plasticizing resin, improves, in comparison with the conventional control represented by the composition A2, the properties in the raw state (Mooney), with a slight deterioration in the elongation moduli and properties of energy at break about equivalent but at the expense of the hysteresis and thus of the properties of rolling resistance for the tire having an inner liner having a composition D2.

Surprisingly, it is noted that, for the composition C2 in accordance with the invention comprising graphite and a polyisobutylene oil of low molecular weight, the same improvements in properties are obtained as for the composition D2 in comparison with the conventional control composition A2 but without a deterioration in the hysteresis and thus in the rolling resistance.

Example 3

The aim of this example is to show that the invention is not limited to just one polyisobutylene oil of low molecular weight.

In this example, the four compositions considered have the base formulation presented in Example 1 and were prepared during the same test as that of Example 1. These compositions are thus called A1, conventional control composition of Example 1, C1, composition in accordance with the invention identical to that of Example 1, and F1 and G1, two other compositions in accordance with the invention.

The compositions C1, F1 and G1 in accordance with the invention all three comprise 10 phe of graphite (3) and 10 phe of the following polyisobutylene oil of low molecular weight:

- for the composition C1, a nonfunctionalized polyisobutylene oil "Oppanol B12 SFN", sold by BASF, with a molecular weight of 25 000 g/mol,
- for the composition F1, "enhanced reactive" nonfunctionalized polyisobutylene oil, sold by Texas Petro Chemical under the name "TPC1350", with a molecular weight of 2500 g/mol,
- for the composition G1, "high reactive" functionalized polyisobutylene oil, sold by Texas Petro Chemical under the name "TPC 5230", with a molecular weight of 2300 g/mol.

The rubber properties of these three compositions are measured before curing and after curing at 150° C. for 60 minutes. The results are given in Table 5.

It is found that, similar to the observation already made for the composition C2 in accordance with the invention, the two compositions F1 and G1 in accordance with the invention also improve the properties in the raw state, in comparison with the conventional control composition A1, and also the properties in the cured state of leaktightness, without a deterioration in the other combined properties (elongation at strain, breaking energy, hysteresis).

It is thus found that different polyisobutylene oils of low molecular weight are suitable for the invention, the examples stated above not being limiting.

The invention claimed is:

1. A tire comprising a rubber composition based on at least a predominant elastomer, chosen from the group consisting of butyl rubbers, essentially unsaturated diene elastomers, essentially saturated diene elastomers and the mixtures of these elastomers, and a reinforcing filler, wherein the composition also comprises graphite and a functionalized or nonfunctionalized polyisobutylene oil, having a molecular weight of between 200 g/mol and 40,000 g/mol, present in a proportion of between 2 and 50 phe.

2. The tire according to claim 1, wherein the polyisobutylene oil has a molecular weight of between 500 g/mol and 35,000 g/mol.

3. The tire according to claim 1, wherein the polyisobutylene oil has a molecular weight of between 1000 g/mol and 30,000 g/mol.

4. The tire according to claim 1, wherein the predominant elastomer is composed of a butyl rubber.

5. The tire according to claim 1, wherein the butyl rubber is a copolymer of isobutene and of isoprene.

6. The tire according to claim 1, wherein the butyl rubber is a brominated polyisobutylene.

7. The tire according to claim 1, wherein the butyl rubber is a chlorinated polyisobutylene.

8. The tire according to claim 1, wherein the predominant elastomer is a diene elastomer.

9. The tire according to claim 8, wherein the predominant elastomer is an essentially unsaturated diene elastomer.

10. The tire according to claim 8, wherein the predominant elastomer is an essentially saturated diene elastomer.

11. The tire according to claim 1, wherein the predominant elastomer represents 100% of the elastomers of the composition.

12. The tire according to claim 1, which comprises one or more other elastomers chosen from the group consisting of butyl rubbers, essentially unsaturated diene elastomers, essentially saturated diene elastomers and the mixtures of these elastomers.

13. The tire according to claim 1, wherein the reinforcing filler comprises carbon black.

14. The tire according to claim 13, wherein the level of carbon black is greater than 30 phe.

15. The tire according to claim 13, wherein the level of carbon black is between 30 and 120 phe.

16. The tire according to claim 14, wherein the level of carbon black is between 30 and 70 phe.

17. The tire according to claim 13, wherein the level of carbon black is between 35 and 60 phe.

18. The tire according to claim 1, wherein the reinforcing filler comprises a reinforcing inorganic filler.

19. The tire according to claim 18, wherein the reinforcing inorganic filler is silica.

20. The tire according to claim 1, wherein the level of polyisobutylene oil is between 5 and 30 phe.

21. The tire according to claim 1, wherein the graphite is provided in a lamellar form.

22. The tire according to claim 1, wherein the graphite is a natural graphite.

23. The tire according to claim 1, wherein the graphite is an expandable natural graphite.

24. The tire according to claim 1, wherein the graphite is an expanded graphite.

25. The tire according to claim 1, wherein the graphite is a synthetic graphite.

26. The tire according to claim 1, wherein the graphite comprises a blend of natural graphite and/or of expandable natural graphite and/or of expanded graphite and/or of synthetic graphite.

27. The tire according to claim 1, wherein the level of graphite is between 3 and 50 phe.

28. The tire according to claim 27, wherein the level of graphite is between 5 and 30 phe.

29. The tire according to claim 1, which comprises a blend of several graphites.

30. The tire according to claim 1, which comprises one or more inert fillers.

31. A tire article comprising a rubber composition based on at least a predominant elastomer, chosen from the group consisting of butyl rubbers, essentially unsaturated diene elastomers, essentially saturated diene elastomers and the mixtures of these elastomers, and a reinforcing filler, wherein the composition also comprises graphite and a functionalized or nonfunctionalized polyisobutylene oil, having a molecular weight of between 200 g/mol and 40,000 g/mol, present in a proportion of between 2 and 50 phe.

32. A tire inner liner comprising a rubber composition based on at least a predominant elastomer, chosen from the group consisting of butyl rubbers, essentially unsaturated diene elastomers, essentially saturated diene elastomers and the mixtures of these elastomers, and a reinforcing filler, wherein the composition also comprises graphite and a functionalized or nonfunctionalized polyisobutylene oil, having a molecular weight of between 200 g/mol and 40,000 g/mol, present in a proportion of between 2 and 50 phe.

33. A process for preparing a rubber composition based on at least a predominant elastomer, chosen from the group consisting of butyl rubbers, essentially unsaturated diene elastomers, essentially saturated diene elastomers and the mixtures of these elastomers, and a reinforcing filler, characterized in that the composition also comprises graphite and a functionalized or nonfunctionalized polyisobutylene oil, having a molecular weight of between 200 g/mol and 40,000 g/mol, present in a proportion of between 2 and 50 phe, wherein the process comprises the steps of:
  incorporating in a diene elastomer, in a mixer:
    a reinforcing filler,
    graphite,
    a polyisobutylene oil,
  everything being kneaded thermomechanically, in one or more goes, until a maximum temperature of between 110° C. and 190° C. is reached;
  subsequently incorporating:
    a crosslinking system; and
  kneading everything up to a maximum temperature of less than 110° C.

34. The process according to claim 33, wherein, between the thermomechanical kneading step and the incorporation of the crosslinking system step, the combined mixture is cooled to a temperature of less than 100° C.

* * * * *

UNITED STATES PATENT AND TRADEMARK OFFICE
CERTIFICATE OF CORRECTION

PATENT NO. : 8,304,482 B2
APPLICATION NO. : 12/747166
DATED : November 6, 2012
INVENTOR(S) : Aurelie Joseph et al.

It is certified that error appears in the above-identified patent and that said Letters Patent is hereby corrected as shown below:

On the Title Page

Item (73) should read    Assignees: Michelin Recherche et Technique S.A., Granges-Paccot (CH); Compagnie Generale des Etablissements Michelin, Clermont-Ferrand (FR)

Signed and Sealed this
Third Day of June, 2014

Michelle K. Lee
*Deputy Director of the United States Patent and Trademark Office*